March 5, 1957         L. A. GERTIN         2,784,364
CONTROL CIRCUIT FOR ALTERNATING CURRENT MOTORS
Filed July 29, 1955
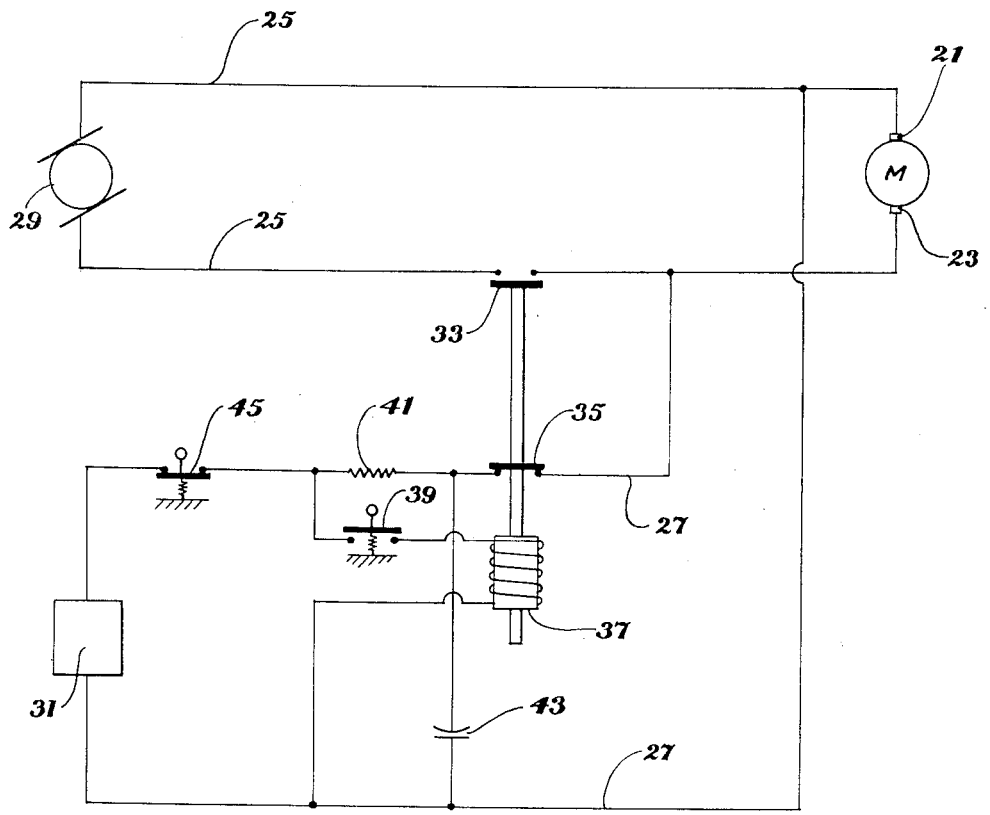
Leo A. Gertin
INVENTOR.
BY
ATTORNEYS

United States Patent Office 2,784,364
Patented Mar. 5, 1957

2,784,364

CONTROL CIRCUIT FOR ALTERNATING CURRENT MOTORS

Leo A. Gertin, Rochester, N. Y., assignor to Eastman Kodak Company, Rochester, N. Y., a corporation of New Jersey Application July 29, 1955, Serial No. 525,312

1 Claim. (Cl. 318—212)

This invention relates to a control circuit for alternating current motors and more particularly to a control circuit by which a quick braking or stopping of a fractional horsepower motor is secured after disconnection of the power supply.

For this purpose I provided an alternating current motor running circuit and a unidirectional current motor stopping circuit. While the motor is operating in the motor running circuit, a capacitor in the motor stopping circuit accumulates a charge from the unidirectional current power source. When the alternating current motor running circuit is disconnected from the motor, the motor stopping circuit is simultaneously connected to the motor, thereby permitting the capacitor to discharge through the motor. Since this capacitor discharge current is unidirectional, it imposes a braking affect on the motor so that the motor is stopped within a very short period of time.

The primary object of the present invention is, therefore, to provide a control circuit for an alternating current motor by which a quick stopping of the motor is secured after disconnection of the alternating current power supply.

A further object of the present invention is to provide a control circuit which consists of relatively few and inexpensive elements for braking an alternating current motor to a quick stop.

Still other objects and advantages of the present invention will be readily apparent to those skilled in the art from the following description with reference to the drawing in which the circuit diagram illustrates a preferred embodiment of my invention.

In the figure, an alternating current motor designated by the character M having terminals 21 and 23 is connected to the motor running circuit 25 and to the motor stopping circuit 27. Motor running circuit 25 is connected to an alternating current power source 29 and motor stopping circuit 27 is connected to a unidirectional current power source 31 such as for example a source of rectified alternating current power. A normal open switch 33 in circuit 25 and a normal closed switch 35 in circuit 27 are simultaneously operated by means of a solenoid 37 connected in parallel with the source 31. Solenoid 37 is actuated by closing control switch 39. A resistor 41 is connected in series with the motor M to reduce the amount of current which passes through the motor M from the unidirectional current power source 31 while switch 35 is closed, and thereby prevents overheating of the motor windings. A capacitor 43 is connected in parallel with the source 31 and across the terminals 21 and 23 of motor M. A switch 45 permits disconnection of the unidirectional current power source 31 from the motor stopping circuit 27.

The operation of my invention will now be described. With switch 45 closed, control switch 39 is depressed into the closed position thereby energizing the coil of solenoid 37 from the unidirectional current power source 31 and resulting in the simultaneous opening of normal closed switch 35 and closing of normal open switch 33. With the closing of switch 33, alternating current from alternating current power source 29 is carried by motor running circuit 25 and impressed on motor M to operate motor M. Motor M continues to operate so long as control switch 39 remains closed and the coil of solenoid 37 remains energized from the unidirectional current power source 31. During this time capacitor 43 accumulates a charge from the unidirectional power source 31. When control switch 39 is released, the coil of solenoid 37 is deenergized and simultaneously switch 33 is opened and switch 35 is closed. Thus the alternating current power source 29 is disconnected from motor M and a unidirectional current at the maximum voltage of source 31 is discharged from capacitor 43 through the motor M. Unidirectional current from source 31 also passes through resistor 41 and switch 35 to motor M. Thus the steady state unidirectional voltage and current applied on motor M by source 31 is greatly reduced because of the presence of resistor 41 in the circuit. The unidirectional current discharged from the capacitor 43 and from source 31 produces a strong braking field in the windings of motor M and the motor M stops within a very short period of time with a minimum number of revolutions after disconnection of the alternating current power supply 29. It will be appreciated that while the braking field produced by the capacitor discharge is very strong, the duration of the discharge is very short so as to not damage the motor windings.

In one application where motor M is a 1/50 horsepower 120 volt alternating current motor operating at 1750 revolutions per minute the control circuit of my invention has repeatedly halted the motor in less than one complete revolution without adversely effecting the motor in any way. To accomplish this, I utilize a 160 microfarad capacitor 43 and a 20 watt resistor 41 having a resistance of 300 ohms. The source of rectified alternating current power 31 charges the capacitor 43 to about 150 volts while switch 35 is open and when switch 35 is closed the resistor 41 produces a voltage drop of approximately 75 to 80 volts to thereby allow only about 25 to 30 volts to be applied across the motor M from the source 31.

Thus it will be appreciated that I have disclosed a control circuit for fractional horsepower alternating current motors which is comprised of a relatively few simple and inexpensive parts and by which the motor is braked to a quick stop.

While many modifications and variations in the illustrated embodiment are possible and will be readily recognized by those skilled in the art, the description is intended to be only illustrative and the scope of the invention is defined in the appended claim.

Having now particularly described my invention what

I desire to secure by Letters Patent of the United States and what I claim is:

A control circuit for an alternating current motor having terminals comprising relay means for selectively connecting said terminals to an alternating current source for operating said motor or to a circuit supplying unidirectional current to said terminals for braking said motor, said braking circuit comprising a capacitor connected across said terminals by said relay means, a unidirectional current supply source, and means connecting said supply source to charge said capacitor and connecting said supply source to said terminals through said relay means whereby a steady unidirectional current is supplied to said motor in addition to the discharge current of the capacitor, said relay means including a solenoid energizable by said unidirectional current supply source for controlling the relay.

References Cited in the file of this patent

UNITED STATES PATENTS

| | | |
|---|---|---|
| 2,434,919 | Girard | Jan. 27, 1948 |
| 2,454,806 | Snyder | July 27, 1948 |
| 2,512,354 | Marbury | June 20, 1950 |

FOREIGN PATENTS

| | | |
|---|---|---|
| 793,622 | France | Nov. 23, 1935 |
| 695,340 | Germany | Aug. 22, 1940 |